United States Patent [19]
Leister

[11] Patent Number: 4,531,405
[45] Date of Patent: Jul. 30, 1985

[54] METHOD AND DEVICE FOR MEASURING THE LEVEL OF A FLUID INSIDE OF A CONTAINER

[75] Inventor: Peter Leister, Waldbronn, Fed. Rep. of Germany

[73] Assignee: Deutsche Gesellschaft et al., Fed. Rep. of Germany

[21] Appl. No.: 467,876

[22] Filed: Feb. 18, 1983

[30] Foreign Application Priority Data

Feb. 23, 1982 [DE] Fed. Rep. of Germany ....... 3206465

[51] Int. Cl.³ .............................................. G01F 23/00
[52] U.S. Cl. .................... 73/290 V; 73/290 R
[58] Field of Search .................. 73/290 V, 290 R, 580, 73/579, 702, 302

[56] References Cited
U.S. PATENT DOCUMENTS 3,019,387  1/1962  Rowe .................... 73/579
4,406,157  9/1983  Miyahara .............. 73/579

FOREIGN PATENT DOCUMENTS 348940  5/1931  United Kingdom .
434994  9/1935  United Kingdom .

Primary Examiner—Charles Frankfort
Assistant Examiner—Denis E. Corr
Attorney, Agent, or Firm—Allegretti, Newitt, Witcoff & McAndrews, Ltd.

[57] ABSTRACT

A method and device for measuring the fluid level in a container. A column of fluid within the container is momentarily subjected to pressure, which causes the column of fluid to vibrate. The oscillation frequency is then measured. Since the frequency depends on the fluid level, the fluid level may be determined from the frequency of oscillation.

20 Claims, 3 Drawing Figures

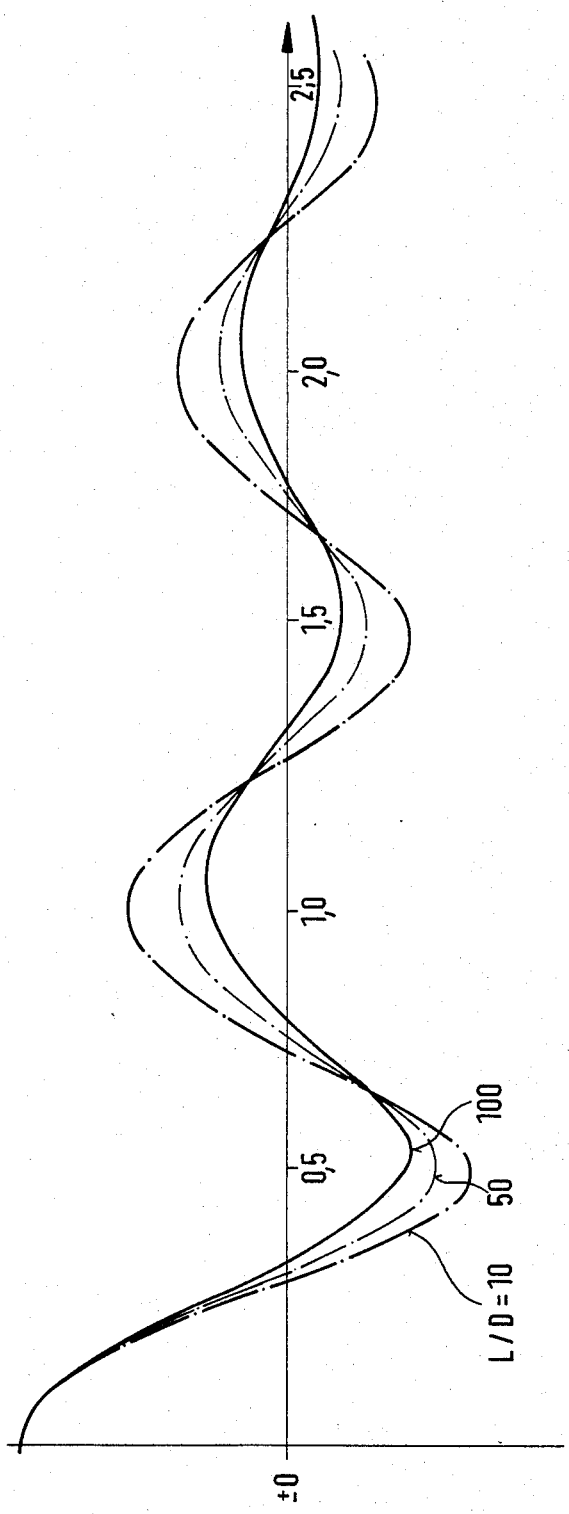

METHOD AND DEVICE FOR MEASURING THE LEVEL OF A FLUID INSIDE OF A CONTAINER

BACKGROUND OF THE INVENTION

The present invention relates to a method and a device for the measuring of the level of a fluid inside of a container.

Several methods and devices for so measuring the level of a fluid are known in the art. For example, it is well known that one may use a vibration probe, sense the position of a float, or measure the difference in pressure of the fluid that is entering and exiting the container. With these measuring methods, however, at least part of the measuring device must be in direct contact with the fluid inside of the container. This feature of the presently available methods and devices can be a great disadvantage if, for example, the fluid being measured is radioactive. Such a circumstance provides an obvious hazard when the device must be serviced while it remains in the radiation field.

Therefore, the so-called "bubble-injection method" may be used to avoid this disadvantage. This method utilizes the principle that the pressure applied at an injection point in order to introduce air bubbles is dependent upon the amount of liquid above the injection point. Such a method, however, may require the continuous injection of air. For many applications, such as a reconditioning plant, this is undesirable. First, an air supply apparatus must be used, along with considerable instrumentation for air production. Air must be supplied at the correct rate and the pressure signal must be converted into a suitable (electric) indicator signal. Moreover, the addition of air, in many applications, results in an aerosol formation. As a result, the exhaust air filters are encumbered.

The present invention therefore provides a novel method for measuring the fluid level in containers. The method of the present invention is more simple to carry out than previously known methods. In particular, it may be used advantageously in measuring the level of radioactive fluids in containers. Furthermore, a suitable device is provided to carry out the method.

SUMMARY OF THE INVENTION

The problem of more easily measuring a fluid level is solved by the method claimed in claim 1 and by the device claimed in claim 8.

According to one embodiment of the present invention, a measuring method and a measuring device are shown which permit the measurement of any fluid levels. Notably, small fluid levels may be determined. In addition, the present invention may be used to determine the level of problematic fluids, which show turbulence, for example, because they are being stirred or are boiling or are effervescing. The method of measurement, according to the present invention, utilizes the dependence between (1) the frequency or period of oscillation of a fluid to (2) the fluid level in the container. The present invention may be carried out simply and at any time; also, the resources required in terms of apparatus are very small. The evaluation of the frequency or period of oscillation can take place through simple electronic evaluation equipment.

Additional advantageous and expedient ways of determining fluid level are claimed in claims that depend from claims 1 and 8.

Compared with the bubble injection method mentioned in the Background of the Invention, the entire apparatus for supplying air may be dispensed with. The reference lead or a similar reference device necessary in the bubble injection method in order to assure accurate measurements is no longer necessary. Compared with the bubble injection method, the capital investment and installation expense can be reduced. Also, use of the present invention allows reduction in the aerosol encumbrance of the container exhaust gas and an increase in availability. Moreover, the present invention makes use of the fact that in a reconditioning plant, the vertical pipe can be connected to the vacuum closed circuit pipe line or container vent line. Such connections are necessary in any case in such an installation.

The present invention evaluates the oscillations that are produced. For such an evaluation, it is only necessary to sense the zero passages, i.e. the reversal of direction of the signal; the amplitude of the oscillation need not be sensed in order for the present invention to operate. The zero passages can, for example, be detected by relatively insensitive pressure pick-offs and evaluated through a very simple electronic means. The ability to detect low fluid levels in a container without the need for evaluating the oscillation amplitude represents a crucial advantage of the present invention. By using the measuring method according to the present invention, the fluid level in several containers may be measured substantially simultaneously, and the number of oscillation scanners or pressure pick-offs can be reduced. In fact, the present invention obviates the need to assign each container with its own pressure pick-off. Rather, the present invention may be interconnected to several containers via suitable pressure-measuring point throwover switches to a single pressure pick-off. According to the present invention, sudden disturbances are imposed on the fluid level in a vertical pipe. Thereafter, the evaluation of the period of oscillation or frequency of the vibration of the fluid level necessitates a discontinuous mode of measurement. Accordingly, the electronic evaluation equipment also operates discontinuously automatically, so that the vibration pick-up or pressure pick-off, with a suitable selection of the cycle time, is available in the intermediate intervals for the evaluation of other containers.

The method according to the present invention is also able to be used advantageously when the fluid inside of the container includes a variety of different types of fluids or solid matter.

Preferred embodiments of the present invention will now be described in further detail with the aid of the attached drawing.

BRIEF DESCRIPTION OF THE DRAWING

FIG. 3 is a graph representing the relative fluctuation of fluid levels within the vertical pipe of the devices shown in FIGS. 1 and 2; in particular, the graph shows the results of using three different ratios of container fluid level to pipe diameter.

DETAILED DESCRIPTION OF THE PREFERRED EMBODIMENT

Figure 1:
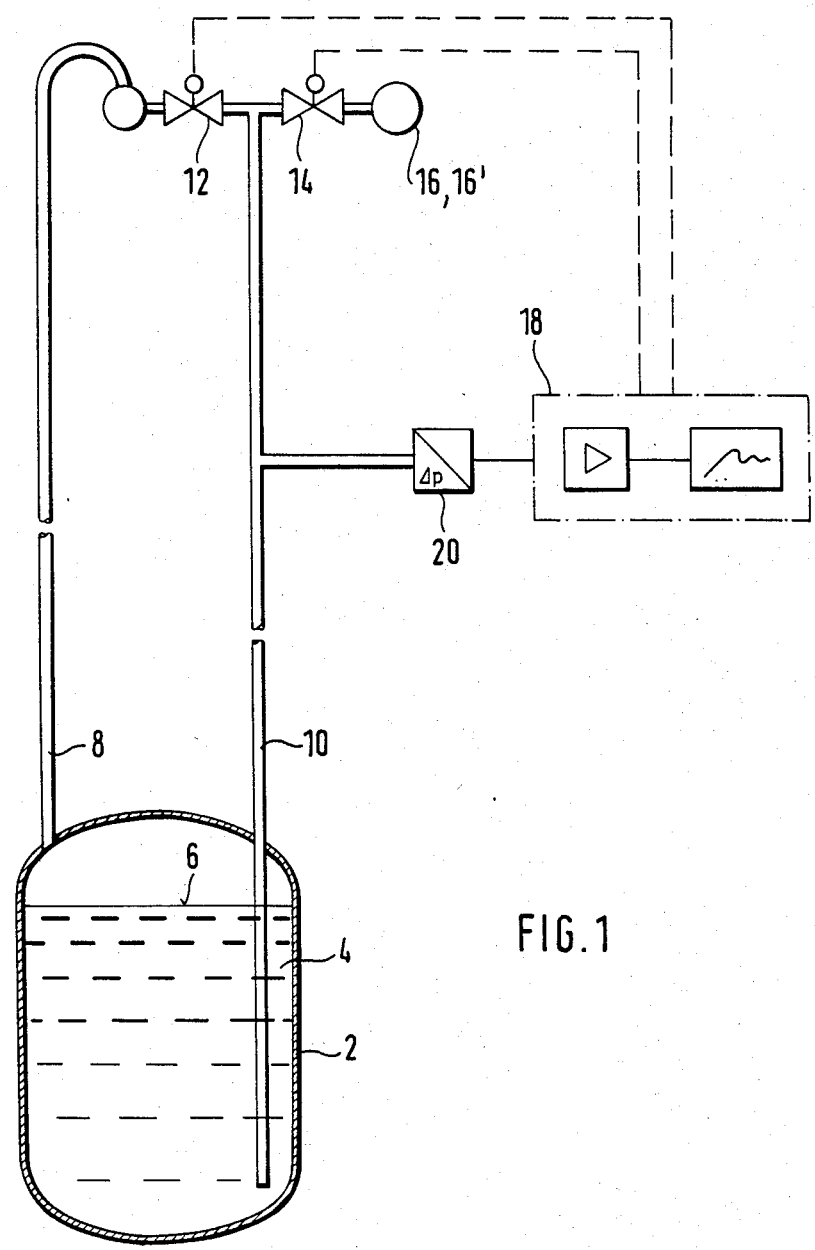
FIG. 1 is a diagram of the preferred form of present invention for measuring the level of a fluid inside of a container.

The same component parts are given the same reference numerals in the figures.

Figure 2:
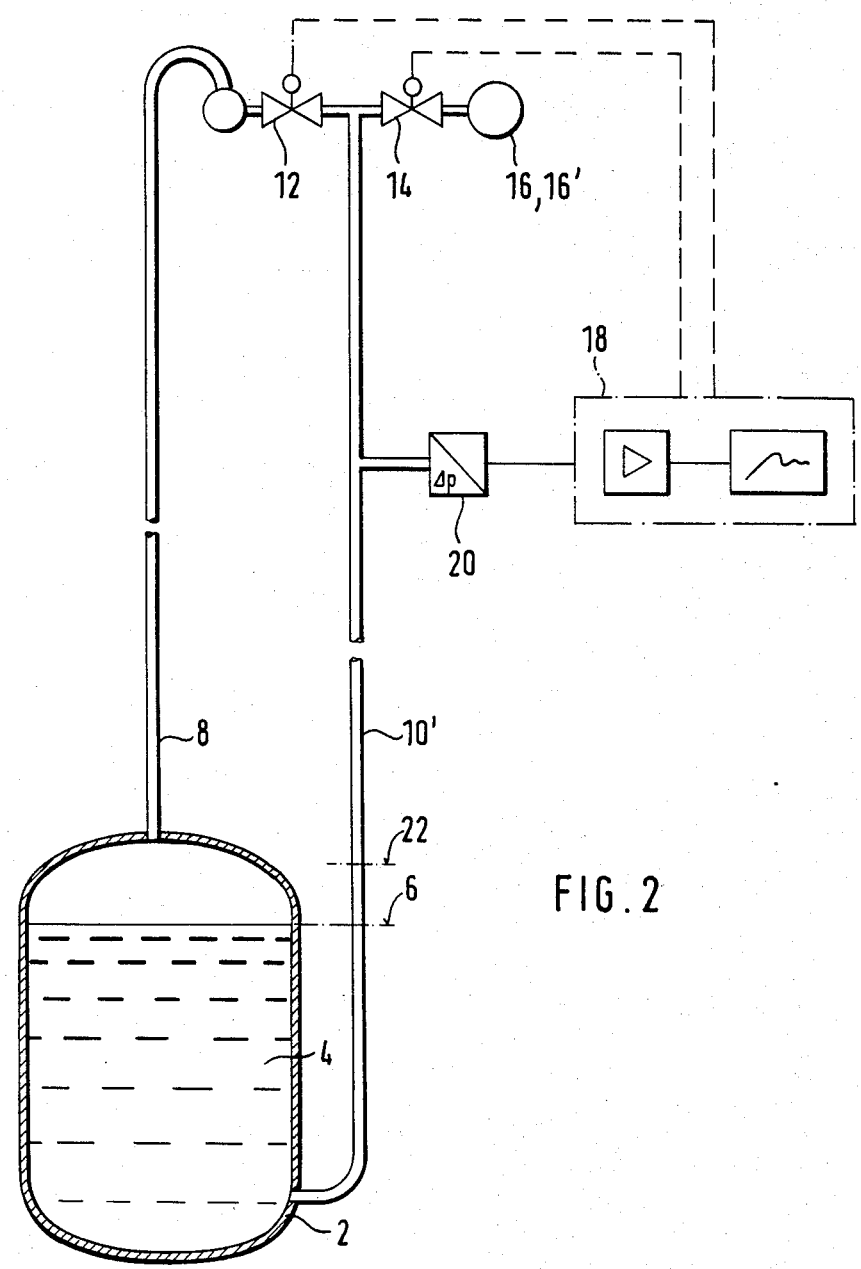
FIG. 2 is a diagram of alternative embodiment for the invention of FIG. 1 for measuring the level of a fluid inside of a container.

FIGS. 1 and 2 show a container 2, which is filled with a fluid 4. The fluid level is designated by reference numeral 6. A duct 8 leads into the fluid-free space of the container 2. A vertical pipe 10 (FIG. 1) or 10' (FIG. 2) leads into the fluid. Both the duct 8 and the vertical pipe 10 or 10' are connected with each other via a shutoff valve 12. The duct 8 is the air vent duct of the type conventionally provided for in a container that holds a radioactive fluid.

The vertical pipe 10 may also be connected, via a shutoff valve 14, with a vacuum source 16. The two valves 12 and 14 are interconnected to a computer 18 or other control device. In addition, a pressure sensor 20 is connected to the vertical pipe 10 or 10', and the output signals from the pressure sensor 20 are transmitted to the computer 18 for evaluation.

The form of embodiment according to FIG. 2 differs from that according to FIG. 1 merely in that the vertical pipe 10 on the inside of the container is replaced by a vertical pipe 10' positioned outside the container.

The measuring device according to FIGS. 1 and 2 operates as follows: Normally the vertical pipe 10 or 10' is connected, via valve 12, with the air vent duct 8. As a result, the fluid level in the container 2 and vertical pipe 10 or 10' is balanced, as is indicated in FIGS. 1 and 2 by the fluid level 6. The valve 14 is closed. In order to carry out a measurement of the fluid level, the vertical pipe 10 is briefly connected, via valve 14, to the vacuum source 16. Consequently, the fluid level in the vertical pipe is briefly raised, for example, to the height 22 shown in FIG. 2. Thereafter, just as briefly, ventilation takes place, via valve 12, and air rushes into the pipe 10. After the brief ventilation, the valves 12 and 14 are closed.

After this artificially produced interference (i.e. raising the level of the fluid in the vertical pipe) the fluid level will drop back and perform oscillations about the equalizing position 6. As a result, the pressure of the column of air over the fluid level fluctuates. Pressure sensor 20 detects these fluctuations and converts them into electrical signals. The electrical signals are provided to the computer 18. The frequency or period of oscillation of the electrical signals, which correspond to the frequency or period of oscillation of the fluid 4 in the vertical pipe 10 or 10', are evaluated by the computer 18 to determine the fluid level. The computer 18 can also control the valves 12 and 14, as already mentioned above.

Apart from a brief application of a vacuum, the production of the oscillations of the fluid column in the vertical pipe 10 or 10' can also take place through brief application of pressure on the fluid 4. This pressure causes the fluid level in the vertical pipe to be initially lowered. Under this alternative, the vacuum source 16 is replaced by a pressure source 16'. Instead of a brief period where air is allowed to enter the pipe 10, the excess air supplied to the pipe 10 by the pressure source 16 is momentarily allowed to escape via valve 12. Subsequently, both valves 12 and 14 are closed and air is prevented from entering or leaving the vertical pipe 10.

The relative fluctuations over time are represented in FIG. 3 for three different ratios of the fluid level L to the diameter D of the vertical pipe 10 or 10'. The frequency of the oscillations or the period of oscillation is dependent on this ratio L/D. Thus, for a constant vertical pipe diameter, the frequency or period of oscillation is dependent on container fluid level L.

Apart from measurement of the pressure fluctuations in the column of air in the vertical pipe 10 or 10', the frequency or period of oscillation can also be determined through sensing the zero passages—i.e. the passage of the fluid level in the vertical pipe 10 or 10' through the level of the fluid level in the container 2. Since the quantity of fluid in the vertical pipe 10 of the preferred embodiment is negligibly small compared with the quantity of fluid in the container 2, the level of the fluid in the container 2 can be assumed to be constant. This constant level of fluid in the container 2 may be referred to as a zero line.

Note, however, that the present invention may be used if the quality of fluid in the pipe 10 is not small. The measuring method may also be carried out if the dimensions of the vertical pipe 10 lie in the order of magnitude of the dimensions of the container 2.

An approximately sinusoidal oscillation can also be impressed on the fluid level in the vertical pipe 10 or 10' via the column of air resting above it. Pressure is applied to the column of air at a frequency that, preferably, is approximately equal to the resonance frequency of the column of fluid within the pipe 10 or 10'.

A form of embodiment is also possible in which no vertical pipe in the true sense is connected to the container 2; instead, a horizontal pipe, or one which is inclined as desired, may be used. Such a pipe is sealed with a membrane or other such insulating installation. With the aid of a suitable vibrator, the membrane, or similar device, is set vibrating, preferably in resonance oscillations. These oscillations are transferred directly or indirectly onto the fluid located in the pipe. From the frequency or resonance frequency of these oscillations, the fluid level in the container can then be determined.

However, since the resonance frequency alters with the fluid level in the container, the stimulus frequency of the oscillation generator would have to be adapted in each case to the variable fluid level. As a result, the oscillation generation must be done with greater effort.

It can be seen that the container fluid level is coupled with the period of oscillation by a second order differential equation.

What is claimed is:

1. A method for measuring a level of a liquid in a container by producing natural vibrations, said container including a primary chamber and a measuring tube, liquid in said primary chamber being in communication with liquid in said measuring tube, said measuring tube including a column of liquid, said column of liquid defining a level and having a resonance frequency dependent upon said level of said liquid in said container, comprising, in combination:

oscillating said column of liquid held by said measuring tube by temporarily altering, with a vacuum, said level of said column of liquid at approximately said resonance frequency of said column of liquid, whereby said column of liquid oscillates with natural vibrations and said resonance frequency may be measured; and measuring and analyzing a frequency of said natural vibrations of said column of liquid in said measuring tube to determine said level of said liquid in said container, said measuring occurring above said level of said liquid in said measuring tube.

2. A method for measuring a level of a liquid in a container by producing natural vibrations, said container including a primary chamber and a measuring tube, liquid in said primary chamber being in communication with liquid in said measuring tube, said measuring tube including a column of liquid, said column of liquid defining a level and having a resonance of frequency dependent upon said level of said liquid in said container, comprising, in combination:

oscillating said column of liquid held by said measuring tube by temporarily altering, with a pressure, said level of said column of liquid at approximately said resonance frequency of said column of liquid, whereby said column of liquid oscillates with natural vibrations and said resonance frequency may be measured; and measuring and analyzing a frequency of said natural vibrations of said column of liquid in said measuring tube to determine said level of said liquid in said container, said measuring occurring above said level of said liquid in said measuring tube.

3. A method as claimed in claim 1 or 2 wherein at least a portion of said measuring tube is positioned within said container.

4. A method as claimed in claim 3 wherein said pipe is positioned in a substantially vertical position.

5. A method as claimed in claim 1 or 2 wherein said measuring tube is interconnected to said container and is positioned outside of said container.

6. A method as claimed in claim 5 wherein said pipe is positioned in a substantially vertical position.

7. A method as claimed in claim 1 or 2 wherein said period of oscillation is determined by sensing zero passages of said level of said column of liquid.

8. An apparatus for measuring the level of a liquid in a container comprising, in combination:

oscillation means for producing natural vibrations in a liquid;

control means for measuring and analyzing said natural vibrations;

a measuring tube, interconnected to said container below said level of said liquid, for holding a column of liquid, said interconnection between said container and measuring tube allowing said level of said column of liquid within said tube to be substantially equal to said level of said liquid in said container, said measuring tube also being connectable to said oscillation means; and detector means, interconnected to said measuring tube above said level of said liquid, for detecting said natural vibrations of said liquid in said measuring tube and responsively providing an output signal;

said control means receiving said output signal from said detector means, measuring said frequency of said natural vibrations of said column of liquid in said measuring tube, and determining said level of said liquid in said measuring tube and said container.

9. An apparatus as claimed in claim 8 wherein said pipe encloses a column of air above said column of said fluid and said column of air has a pressure and wherein said oscillation means includes:

vacuum means, interconnected to said pipe, for reducing said pressure of said column of said air; and valve means, interconnected between said pipe and vacuum means, for selectively isolating said vacuum means from said column of air.

10. An apparatus as claimed in claim 8 wherein said pipe encloses a column of air above said column of said fluid and said column of air has a pressure and wherein said oscillation means includes:

pressure means, interconnected to said pipe, for increasing said pressure of said column of air; and valve means, interconnected between said pipe and pressure means, for selectively isolating said pressure means from said column of air.

11. An apparatus as claimed in claim 8 wherein said column of said fluid has a resonance frequency and said pipe encloses a column of air above said column of said fluid and said oscillation means oscillates said column of air with approximately said resonance frequency of said column of fluid.

12. An apparatus as claimed in claim 8 further comprising valve means, interconnected between said pipe and oscillation means, for selectively isolating said oscillation means from said column of air and wherein said valve means periodically interconnects said column of air with said oscillation means.

13. An apparatus as claimed in claim 8 wherein said sensor means is a pressure pick-off interconnected to said column of air.

14. An apparatus as claimed in claim 13 wherein said pressure pick-off produces an output signal having a period of oscillation substantially equal to said period of oscillation of said column of said fluid in said pipe and wherein said control means receives said output signal in order to determine said fluid level.

15. An apparatus as claimed in claim 8 wherein said sensor means includes means for sensing zero passages of said level of said fluid in said pipe.

16. An apparatus as claimed in claim 15 wherein said zero passage sensor produces an output signal having a period of oscillation substantially equal to said period of oscillation of said column of said fluid in said pipe and said control means receives said output signal in order to determine said fluid level.

17. An apparatus as claimed in claim 8 wherein said pipe and container encompass, respectively, first and second volumes of said fluid and wherein said first volume is negligibly small relative to said second volume.

18. An apparatus as claimed in claim 8 wherein said pipe and container encompass, respectively, first and second volumes of said fluid and wherein said first volume lies in the same order of magnitude as second volume.

19. A method for measuring a level of a liquid in a container by producing natural vibrations, said container including a primary chamber and a measuring tube, liquid in said primary chamber being in communication with liquid in said measuring tube, said measuring tube including a column of liquid and a column of air thereabove, said column of air having a pressure, comprising, in combination:

oscillating said column of liquid held by said measuring tube, whereby said column of liquid oscillates with natural vibrations; and measuring and analyzing a frequency of said natural vibrations of said column of liquid in said measuring tube to determine said level of liquid in said container, said measuring occurring above said level of said liquid in said measuring tube and including the step of sensing fluctuations of said pressure of said column of air.

20. A method for measuring a level of a liquid in a container by producing natural vibrations, said container including a primary chamber and a measuring tube, liquid in said primary chamber being in communication with liquid in said measuring tube, said measuring tube including a column of liquid and a column of air thereabove, said column of air having a pressure and said pressure initially being at a first state, comprising, in combination:

changing said pressure of said column of air to a second state;

allowing said pressure of said column of air to resume said first state;

isolating said column of air, whereby said column of liquid oscillates with natural vibrations; and measuring and analyzing a frequency of said natural vibrations of said column of liquid in said measuring tube to determine said level of liquid, said measuring occurring above said level of said liquid, whereby fluctuations of said pressure of said column of air are sensed and evaluated to determine said frequency of said natural vibrations.

* * * * *